A. S. VOGT.
DRAINAGE SYSTEM FOR TRACK SCALES.
APPLICATION FILED JUNE 15, 1917.
1,257,553.
Patented Feb. 26, 1918.
4 SHEETS—SHEET 1.
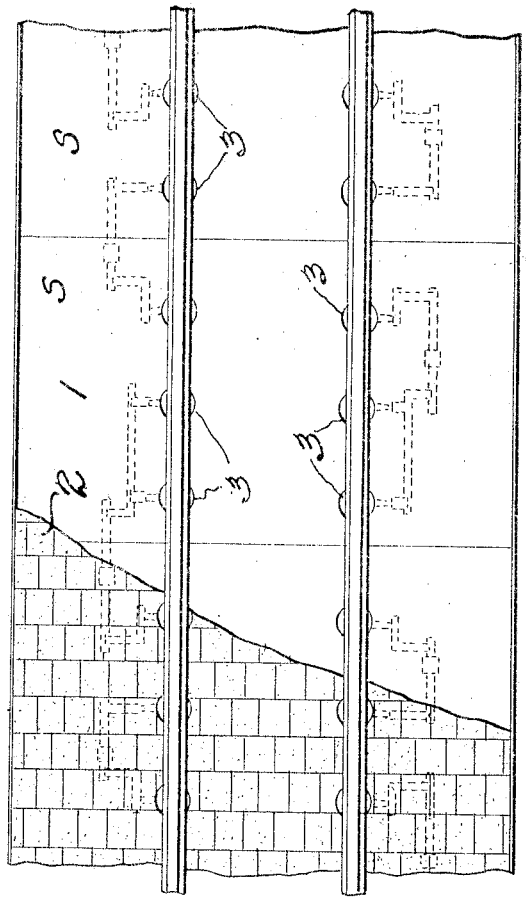
Inventor
AXEL S. VOGT
By N. E. Gee
Attorney

A. S. VOGT.
DRAINAGE SYSTEM FOR TRACK SCALES.
APPLICATION FILED JUNE 15, 1917.

1,257,553.

Patented Feb. 26, 1918.
4 SHEETS—SHEET 2.

Inventor
AXEL S. VOGT.
By N. E. Gee
Attorney

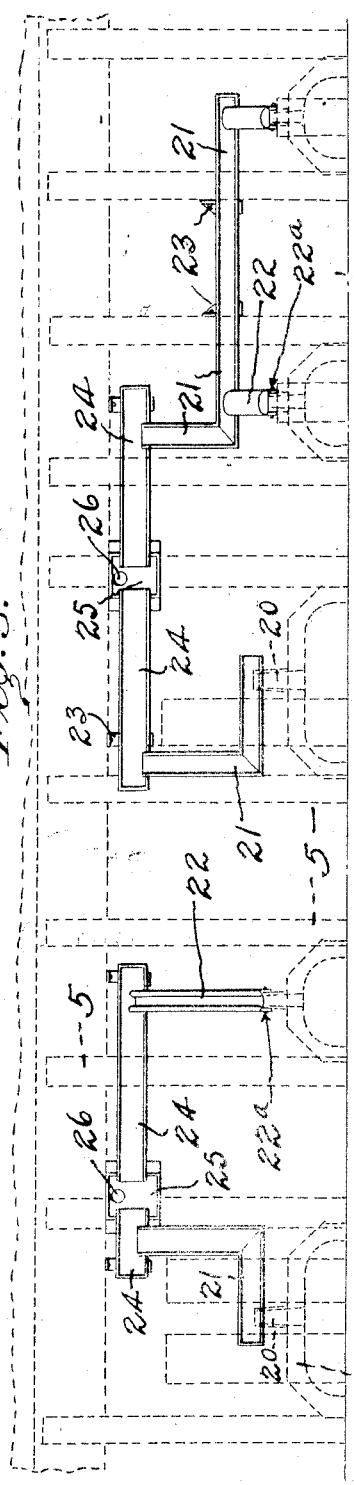
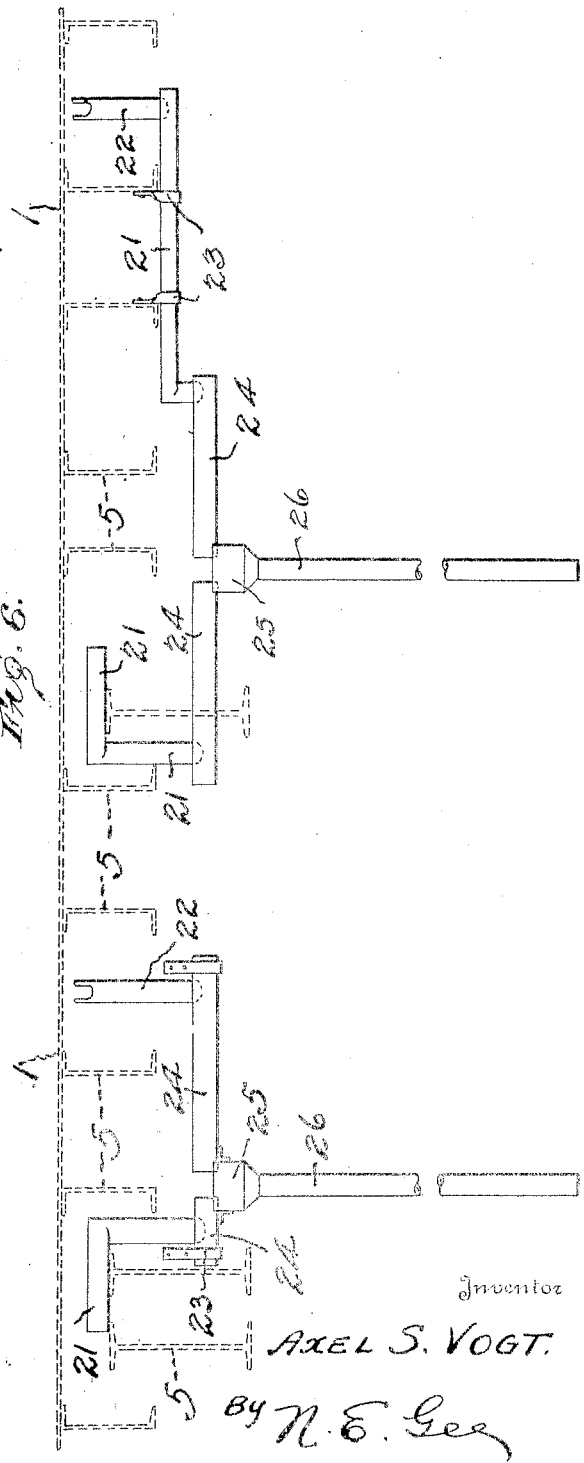

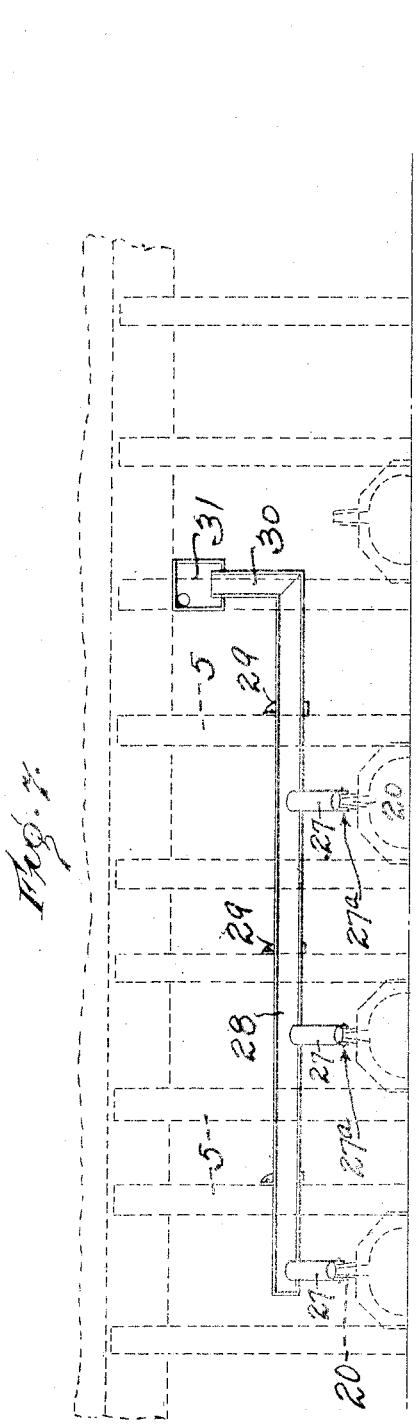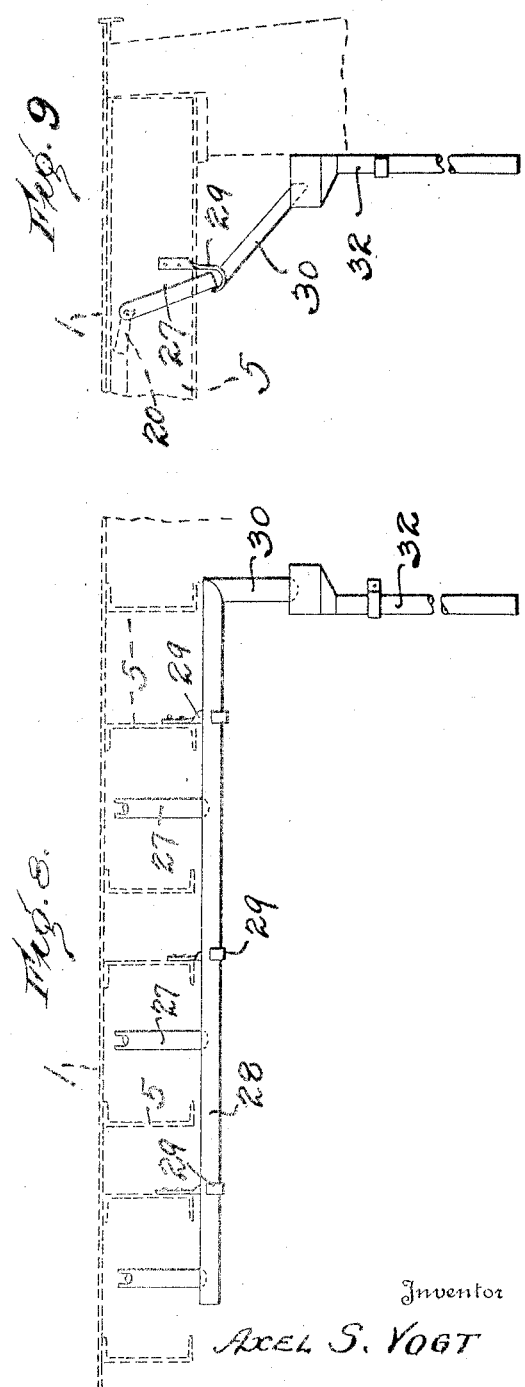

UNITED STATES PATENT OFFICE.

AXEL S. VOGT, OF ALTOONA, PENNSYLVANIA.

DRAINAGE SYSTEM FOR TRACK-SCALES.

1,257,553.    Specification of Letters Patent.    Patented Feb. 26, 1918.

Application filed June 15, 1917. Serial No. 174,951.

*To all whom it may concern:*

Be it known that I, AXEL S. VOGT, a subject of the King of Sweden, residing at Altoona, in the county of Blair and State of Pennsylvania, have invented certain new and useful Improvements in Drainage Systems for Track-Scales, of which the following is a specification.

This invention relates to track scales, and more particularly has special reference to novel means for preventing water and foreign matter from reaching the scale mechanism.

According to the present practice, the scale vault or pit which houses the scale mechanism is provided with a deck or cover that is rigid and stationary, while the rail supports of the scale mechanism project through suitable slots or openings therein to receive the rails of the scale track-sections. In some types of track scales, where a slot is employed in the scale deck to permit of the projection of the track supports, a rain shield or guard may be conveniently utilized to prevent water and foreign matter from entering the pit, but in other types where the track supports merely project through suitable isolated clearance openings, it is not practical nor desirable to employ the same character of means for keeping out water and foreign matter.

Accordingly, the present invention has for its primary object the provision of novel track supporting means and a system or arrangement of spouts and gutters which coöperate therewith to effectively carry off water that would otherwise follow the same down onto the scale mechanism, and thus materially decrease its accuracy and impair its efficiency.

A further object of the invention is to provide a simple and practical construction which may be readily installed and conveniently carried by the scale deck in such a manner that it may be readily inspected or repaired when necessary.

With the above and other objects in view which will more readily appear as the nature of the invention is better understood, the same consists in the novel construction, combination and arrangement of parts hereinafter more fully described, illustrated and claimed.

A preferred and practical embodiment of the invention is illustrated in the accompanying drawings, in which—

Figure 1 is a top plan view of a scale deck, showing the relative location of the scale support openings and the general arrangement of the present drainage system with reference thereto.

Fig. 2 is a vertical cross sectional view of the construction shown in Fig. 1.

Fig. 5 is a plan view showing the arrangement of spouts and gutters for conveying water from the deck traps to the waste pipe in full lines, and the scale deck in dotted lines.

Fig. 6 is a side elevation of the construction shown in Fig. 5.

Fig. 7 is a plan view similar to Fig. 5 showing a modification of the invention.

Fig. 8 is a side elevation of the construction shown in Fig. 7.

Fig. 9 is an end elevation of the construction shown in Figs. 7 and 8.

Similar reference characters designate corresponding parts throughout the several figures of the drawings.

Figure 3:
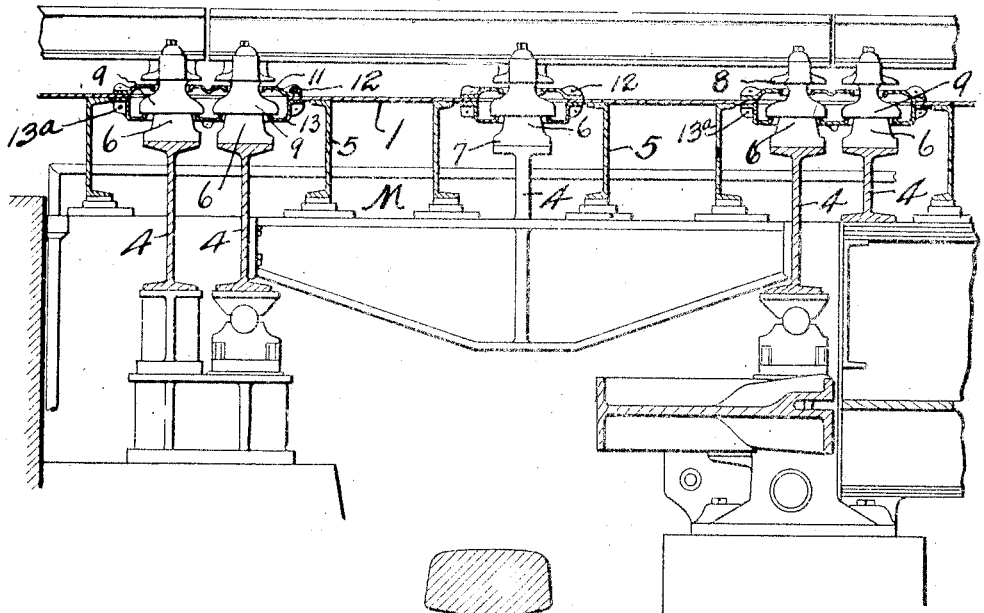
Fig. 3 is a vertical longitudinal sectional view, showing the track supports in elevation and the deck trap elements of the drainage system in connection therewith.

The present invention is especially adapted for use in connection with a scale deck having a plurality of separate spaced openings for the scale supports, as previously pointed out. Therefore, as will be observed from Fig. 1, of the drawings, the numeral 1 designates generally a scale deck or pit cover, which may have thereon a suitable insulating covering 2, and preferably includes a plurality of sections S provided with the rail or track support openings 3.

The scale mechanism designated generally as M is located in the pit or vault V beneath the deck 1, and as shown, may include the horizontal load supporting beams 4, which are suitably spaced with reference to the reinforcing beams 5 of the deck, so as to permit of the proper operation of the scale parts under load. These beams 4 have mounted thereon the track supports designated generally as 6 and which, as will be observed from Fig. 4 preferably include a flared attaching base 7 and an enlarged track or rail fastening head portion 8, while the body portion thereof tapers upwardly as shown, and is provided at its intermediate point with an inverted bell or umbrella-shaped water-shed flange 9. These supports project through the openings 3 in the scale deck to support the rails of the scale track-section, and must necessarily have a sufficient degree of movement to permit of the scale mechanism operating under the weight of loaded cars on the scale track-section. Accordingly, to provide for this movement of the track supports, and at the same time arrest water and foreign matter which would enter the vault or pit through the openings 3, the deck adjacent the latter is fitted with a trap or catch basin element designated generally as 10.

This deck trap element 10 essentially comprises an exterior support-opening shield or guard member preferably in the form of a ring 11 which may be made in sections whereby the same may be readily fitted around the shank or body portion of the track support, and then secured together as indicated at 12 in Fig. 2, and an interior channel or basin member 13 which is likewise made in sections and secured together to make a water tight joint as indicated at 13$^a$.

Figure 4:
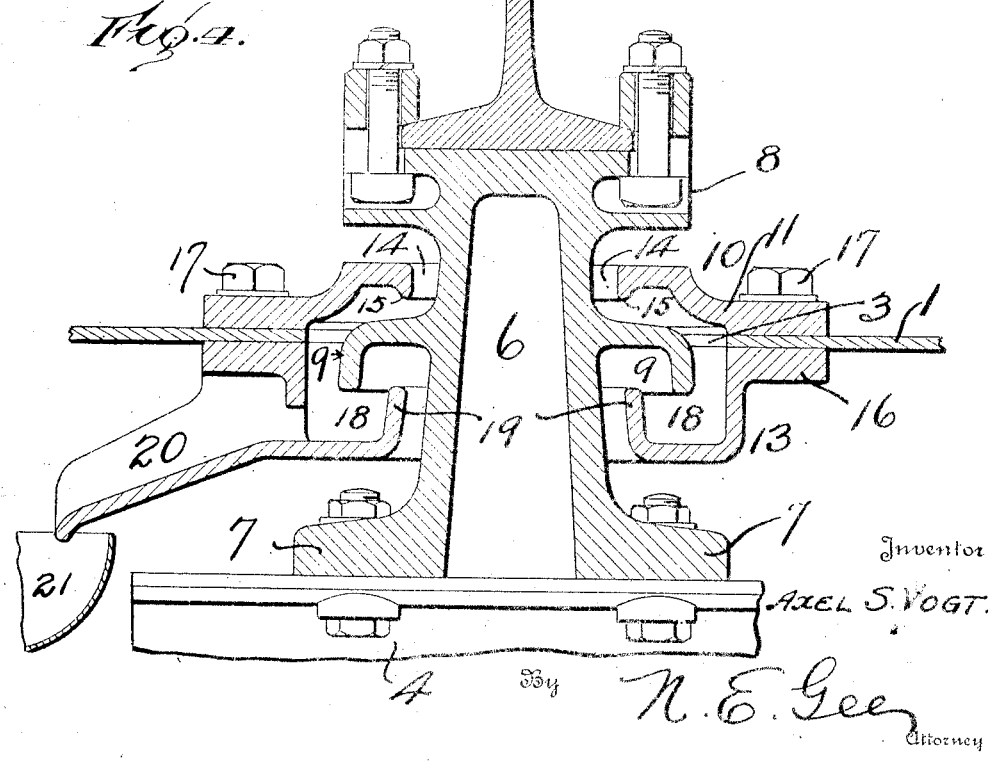
Fig. 4 is an enlarged detail sectional view showing the construction of the scale support and the means associated with the deck opening to prevent water from entering the pit.

The said supporting ring 11 is provided with a central opening 14 which lies directly beneath the enlarged head portion 8 of the rail or track support 6 and is thus protected thereby, and the inner wall of this member adjacent the opening is formed with a depending bead or drip flange 15 which overhangs the outer or upper face of the umbrella shaped water shed flange 9 of the track support, as clearly shown in Fig. 4, whereby water passing in through the opening 14 and dropping off the bead 15 will fall onto the back of the said flange 9. The said interior catch basin member 13 of the deck trap 10 is provided with a securing flange 16 which may be bolted to the underside of the scale deck 1 by means of the bolts 17 that pass through the rim of the exterior cover member 11, and also includes an annular receiving channel 18, one wall 19 of which projects upwardly into the interior of the bell or umbrella shaped water shed flange 9, whereby all water shed from the latter will be effectively directed in the receiving channel 18.

This receiving channel 18 of the deck trap structure is provided at one side with an outlet spout 20, which may discharge directly into a suitable gutter section in some forms of the invention, or where the structure of the scale mechanism will not permit, it may discharge into a relatively short conveyer-spout section which is connected with the gutter. That is to say, as will be observed from Fig. 5 certain of the spouts 20 of the track supports empty directly into the main angular gutter sections 21, while other of the spouts 20 discharge into the relatively short conveyer sections 22 which lead to the sections 21. The said latter sections are preferably carried by suitable hanger brackets 23 which are suspended from the lower edges of the beams 5 which reinforce the pit cover 1, as clearly shown in Figs. 2, 5, and 6, and the sections 22 are preferably pivoted to the discharge ends of the spouts 20 as indicated at 22$^a$.

At suitable locations there is also provided the receiving troughs 24 which take the water from the main gutter sections 21 and carry it to the enlarged receiving chamber 25 of the waste pipe 26. Accordingly, it will be apparent from the constructions shown in Figs. 5 and 6, that water will be readily arrested in the deck trap structure 10 and thence conveyed to the waste pipe 26 through a suitable arrangement of gutters and troughs, without making its way to the scale mechanism.

It will, of course, be understood that various arrangements of gutters, spouts and troughs may be employed to carry the water from the catch basins to the waste pipe, according to the particular construction of the scale pit deck, and scale mechanism, and other conditions of use. Accordingly, Figs. 7, 8, and 9 of the drawings show a modified form of means for conveying the water from the catch basin elements of the deck traps to the waste pipe. In these figures the spouts 20 of the said deck traps discharge into suitable pipes 27 pivotally carried as indicated at 27$^a$ by the ends of said spouts, and emptying into a common discharge trough 28 carried by suitable brackets 29 securely fastened to the beams 5 of the scale deck. As shown in the figures of the drawings above referred to, this discharge trough 28 is provided with an angularly disposed downwardly directed delivery extension 30 which empties into the receiving hopper 31 of a waste pipe connection 32.

From the foregoing, it is thought that it will be clearly apparent that the present invention provides novel effective means for trapping water which enters the scale support openings and carrying the same to waste, and without further detailed description it is thought that the features and advantages of the invention will be readily apparent.

I claim:

1. In a drainage system for track scales, the combination with a scale deck having openings and a scale mechanism below the deck, of rail supports carried by the scale mechanism and projecting through said openings, and water trapping devices carried by the deck at the openings and coöperating with the rail supports to prevent water from entering the scale pit.

2. In a drainage system for track scales, the combination with a scale deck having openings and a scale mechanism below the deck, of rail supports carried by the scale mechanism and projecting through said openings and having water-shed means, means carried by the deck at each opening for collecting water shed from the rail supports, and means also carried by the deck at the under side thereof and in communication with said means for collecting said water from the rail supports to carry the water therefrom to waste.

3. In a drainage system for track scales, the combination with a pit and the scale mechanism therein, of a cover for the pit having a plurality of separate spaced openings, a plurality of rail supports carried by the scale mechanism and projecting through said openings, means at each opening for trapping water shed from the rail supports, and a system of gutters arranged beneath the deck and communicating with the means for trapping the water shed from the supports.

4. In a drainage system for track scales, the combination with a scale deck having openings and a scale mechanism below the deck, of rail supports carried by the scale mechanism and projecting through said openings, said supports having an intermediate water-shed flange, means carried by the deck at each support opening for coöperating with said flange to trap water, and means for carrying water from said latter means to waste.

5. In a drainage system for track scales, the combination with the scale deck having openings and a scale mechanism below the deck, of rail supports carried by the scale mechanism and projecting through said openings, said supports having an intermediate water-shed flange, a trap carried by the deck at each scale support opening and comprising an exterior shield member and an interior channel member having a spout, gutter means receiving from said spout, and a waste pipe connection for said gutter means.

6. In a drainage system for track scales, the combination with a scale deck having openings and a scale mechanism below the deck, of rail supports carried by the scale mechanism and projecting through said openings, said rail supports having a water-shed flange, a trap carried by the deck at each opening and comprising an exterior shield member secured to the upper side of the deck and an interior channel member secured to the underside of said deck and having a delivery spout, gutter means suspended from the underside of the scale deck and arranged to receive water from said delivery spout, and a waste pipe connection for said gutter means.

7. In a drainage system for track scales, the combination with a scale deck having openings, and a scale mechanism below the deck, of rail supports carried by the scale mechanism and projecting through said openings, said supports having an intermediate water-shed flange, a trap carried by the deck at each opening and comprising an exterior shield member fitted to the outer side of the scale deck at each rail support opening and projecting over the upper face of the said water shed flange, and an interior channel member fitted to the inside of the deck at each opening and having one wall of its channel projecting into the hollow underside of the water-shed flange of the rail support, and also having a spout, and gutter means for receiving from said spout.

8. In a drainage system for track scales, the combination with a scale deck having a plurality of spaced openings, and a scale mechanism below the deck, of rail supports carried by the scale mechanism and projecting through said openings, said rail supports having an enlarged rail seating head, an enlarged securing base, and an intermediate water-shed flange, a trap carried by the deck at each opening and comprising an exterior shield member fitted to the scale deck around the opening and having a beaded drip flange located over the upper face of the water-shed flange of the rail support, and an interior channel member fitted to the underside of the deck at the opening and having one wall of the channel projecting into the hollow underside of the said flange of the rail support and also having a spout, gutter means carried by the underside of the deck, and a waste-pipe connection for receiving water from said gutter means.

9. In a drainage system for track scales, the combination with a scale deck having openings, a scale mechanism below the deck, of rail supports carried by the scale mechanism and projecting through said openings, a trap having a spout located in each opening and surrounding said supports, gutter means for receiving from said spout of the trap, brackets carried by the underside of the scale deck for supporting said gutter means, and a waste pipe connection for said gutter means.

10. In a drainage system for track scales, the combination with a pit and a scale mechanism therein, of a cover for the pit having a plurality of spaced openings, rail supports carried by the scale mechanism and projecting through said openings, a trap carried by the cover at each opening and having a spout, brackets carried by the underside of the cover, gutter means carried by the brackets and receiving from said spout of the trap, and a waste pipe connection supported by one of the pit walls and receiving from said gutter means.

In testimony whereof I affix my signature in presence of two witnesses.

AXEL S. VOGT.

Witnesses:
W. R. FORSTER,
JAMES T. HANLON.